Figure 1:
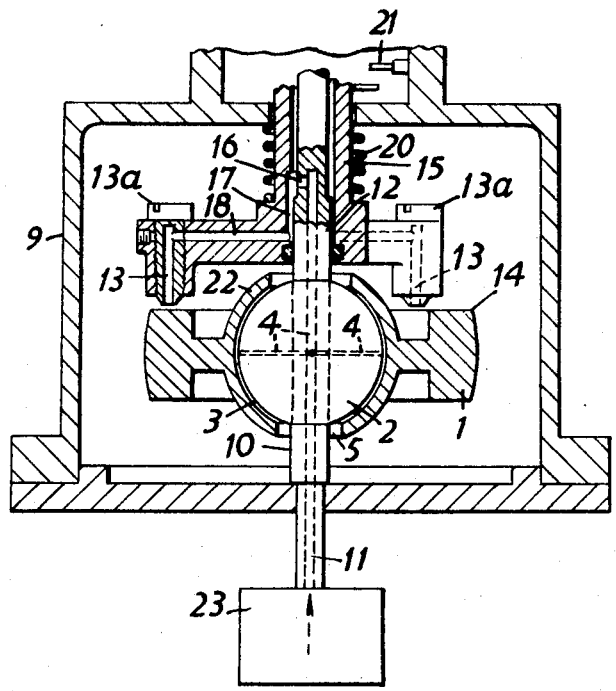

United States Patent
Davis

[15] 3,677,098
[45] July 18, 1972

[54] GYROSCOPE UNCAGING DEVICE

[72] Inventor: John Christopher Hammond Davis, Wargrave, England

[73] Assignee: Plessey Telecommunications Research Limited, Toplow, England

[22] Filed: Sept. 30, 1970

[21] Appl. No.: 76,666

[30] Foreign Application Priority Data

Oct. 11, 1969   Great Britain..................48,149/69

[52] U.S. Cl....................................74/5.12, 74/5.43, 74/5.7
[51] Int. Cl. .................................G01c 19/26, G01c 19/30
[58] Field of Search..................74/5.1, 5.12, 5.14, 5.7, 5.43; 33/204 M

[56]  References Cited

UNITED STATES PATENTS

| | | | |
|---|---|---|---|
| 3,416,378 | 12/1968 | Evans et al.........................74/5.43 X |
| 3,115,784 | 12/1963 | Parker....................................74/5.12 |
| 3,438,269 | 4/1969 | DeCotiis................................74/5.12 |
| 3,457,793 | 7/1969 | Evans.......................................74/5.1 |

*Primary Examiner*—Manuel A. Antonakas
*Attorney*—Scrivener, Parker, Scrivener & Clarke

[57] ABSTRACT

In order to minimize uncaging kicks on the rotor of a gyroscope device, the caging member acts on the rotor through air buffer means which, in air-bearing fashion, produce, during caging, aligning forces as a result of differences in the thickness of the air cushion. These forces rapidly decrease in size during uncaging by withdrawal of the caging member.

5 Claims, 2 Drawing Figures

PATENTED JUL 18 1972 3,677,098

GYROSCOPE UNCAGING DEVICE

This invention relates to gyroscope devices incorporating a gyroscope rotor normally suspended in a supporting structure for free rotation and universal angular movement, and auxiliary means for so-called caging of the rotor to ensure positive alignment of its axis with an axis which is fixed to the supporting structure and passes through the center of gravity of the rotor. Caging and subsequent uncaging is required to effect the original spin-up of the rotor and also sometimes during use, to effect an occasional slight drift correction and/or effect a further spin-up to make-up for lost speed of spin. While the necessary alignment can be readily achieved by, for example, axial application of a mechanical end-face bearing, this leads to undesirable so-called uncaging kicks when the caging axis shows any appreciable misalignment with the direction of the axis of rotation of the earth. The present invention has for an object to provide an improved caging arrangement in which uncaging kicks are minimized and a high accuracy of alignment can nevertheless be achieved.

According to the invention caging is effected by causing a bearing member to co-operate with a corresponding surface of the rotor through the medium of an air cushion, thus producing an air bearing which, in the case of misalignment, produces aerodynamic forces to establish alignment but wherein these forces rapidly disappear when the bearing gap is increased to produce uncaging. In a practical example this bearing is arranged to have a gap which in the balanced caging position has a width in the region of 0.013 millimeter thus ensuring rapidly increasing restoring torque as positional errors small compared with the width of the gap are introduced.

In a preferred form the invention is employed in combination with a spherical main air bearing supporting the rotor, and in a preferred embodiment of the invention the caging bearing is so arranged that its air supply is provided entirely by air spilling out of the main air bearing supporting the rotor, thus minimizing its power consumption.

Figure 2:
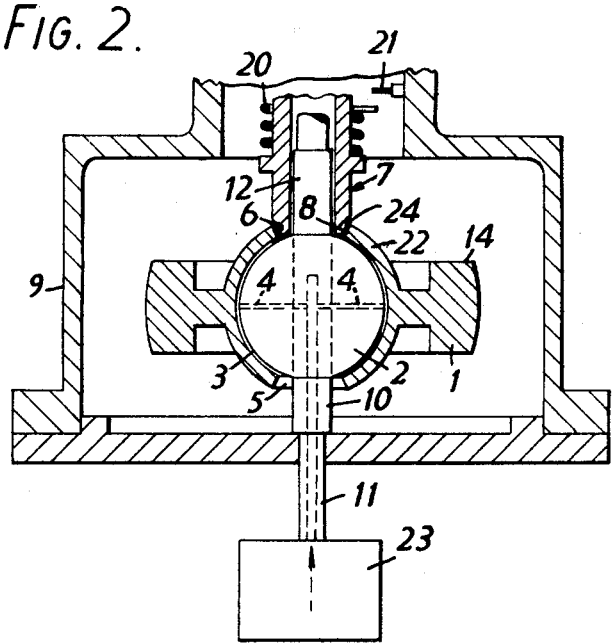

In order that the invention may be more readily understood, two embodiments will now be described by way of examples with reference to the accompanying drawings, in which FIGS. 1 and 2 are elevations in axial section, respectively illustrating the two embodiments.

In each of the two illustrated embodiments a gyroscope rotor 1 is supported by an air bearing on a spherical stator 2 which is secured in a housing 9 by a stem 10, the air bearing gap 3 being fed with air from a supply source 23 through a bore 11 which extends through the stem 10 and which communicates with the air-bearing gap 3 by cross-bores 4 of the stator extending to points distributed around the circumference of the spherical stator 2. The stem 10 extends in the direction of the axis of spin of the rotor when the latter is in the desired position of alignment in which the axis is required to be stabilized when caging is effected.

Referring now first to the construction of FIG. 1, the stator is further provided with a coaxial extension 12 of the stem 10 at the diametrically opposite side of the spherical stator body 2. A caging member 15 is slidably guided on the stem extension and has three axially directed air-jet nozzles 13 which are uniformly spaced round the axis of the stem to produce jets of air parallel to this axis which act, during caging, upon an upper end face 14 of the rotor 1, this surface 14 being perpendicular to the spinning axis of the rotor. The caging member 15 is movable between its illustrated caging position and an inoperative position in which its nozzles are separated from the surface 14 by a greater distance. When the caging member 15 is in its illustrated caging position, the jet nozzles 13 face this surface 14 at a close distance to produce an air bearing effect. They are fed with air under pressure from the stem bore 11 via radial bores 16 in the stem extension 12, from each of which an axial groove 17 leads to a radial passage 18 provided in the caging member 15 for each nozzle 13. In the case of any slight angular misalignment of the rotor, the bearing gaps between the individual nozzles 13 and the surface 14 will be unequal with the result that the nozzle nearest to the surface 14 will produce a greater thrust force than the other two nozzles, thus causing the gyroscope rotor 1 to swivel round its spherical supporting bearing to reduce the angular misalignment and thus the difference in forces until correct angular alignment has been achieved.

A spring 20 is preferably provided to urge the caging member 15 into the caging position, and the individual jet nozzles 13 are preferably longitudinally adjustable in the caging member as indicated by being formed as screws provided with screw-driver slotted heads 13a, so that the jet nozzles 13 can be set to have a uniform distance of, say, 0.013 mm. from the surface 14 when the axes of the rotor 1 and the caging structure 15 are angularly aligned.

For normal operation of the gyroscope the caging member 15 is withdrawn in the axial direction from the illustrated position; some means for this purpose are schematically indicated at 21.

In FIG. 2, in which corresponding parts bear the same reference numerals as in FIG. 1, the spider-like caging member 15 of FIG. 1 has been replaced by a sleeve-type caging structure 7 which encircles the shaft extension 12, and which is provided at its end adjacent to the rotor 1 with an external taper surface 6, while the rotor shell 22 which co-operates with the spherical stator portion 2 via the spherical air-bearing gap 3, has a corresponding internal cone surface 8 so positioned that, when the caging structure 7 is in the illustrated caging position and the rotor is in axial alignment with the stem 10, a cone-shaped air gap 24, approximately 0.013 mm wide, is left between the opposed cone surfaces 6 and 8. Since this air gap 24 constitutes the only outlet of air from the main air-bearing gap 3 at the upper side of the rotor 1, the air escaping at the upper side of the bearing gap 3 will provide a continuous flow of air through this conical gap 24 with the result that any slight angular misalignment of the rotor relative to the caging axis will create an unbalance of the force distribution round the cone surface 8 of the rotor-shell member 22, and this unbalance tends to reduce the misalignment. The lower side of the rotor is provided, in both embodiments with an aperture 5 which clears the stem 10 sufficiently to allow for operative swivel movement of the rotor axis, this aperture 5 also providing an outlet for air from the spherical air bearing gap 3 at the lower side of the rotor 1.

What I claim is:

1. A gyroscope device comprising a supporting structure, a stator, a rotor constructed symmetrically to a rotor axis, and means for caging the rotor on the stator relative enveloping a caging axis intersecting said rotor axis, wherein the stator includes a spherical bearing member, a stem connecting said spherical bearing member to the supporting structure and having a cylinder surface coaxial with said caging axis, and gas bearing means supporting the rotor on said spherical bearing member for rotation about said rotor axis and for universal movement about the point of intersection of said rotor axis with said caging axis, said stem and bearing member being provided with passages for the supply of gas to the surface of said bearing member, the rotor including a spherical shell portion enveloping said spherical bearing member at a small distance therefrom so as to form therewith a gas bearing when gas is supplied through said passages, and the rotor being formed to include a surface of revolution which is coaxial with said rotor axis and which has a profile extending approximately radially from the said point of intersection of the rotor axis with the caging axis, said caging means including a caging member guided on said cylinder surface for movement in the direction of said caging axis between a caging position and a free position, said caging member having bearing-surface portions which are spaced round said caging axis at equal distances from said axis and which are so arranged that when said caging member is in said caging position, said bearing surface portions face said surface of revolution of the stator at small and equal distances, the gyroscope device also including means for producing between each said bearing surface portion and said surface of revolution a flow of gas operative, when the rotor axis forms an angle with the caging axis, to exert upon the rotor a couple tending to reduce the said angle.

2. A gyroscope device as claimed in claim 1, wherein the caging member is provided with a plurality of jet nozzles whose axes are approximately parallel to the caging axis, and which respectively penetrate said surface portions to face an approximately plane end face of the rotor.

3. A gyroscope device as claimed in claim 2, which includes means f axially adjusting the individual jet nozzles in the caging member.

4. A gyroscope device claimed in claim 1, wherein the spherical bearing member is provided, at a point diametrically opposite to the stem, with a stem extension which includes said cylinder surface.

5. A gyroscope device as claimed in claim 1, wherein the said surface of revolution is an inwardly facing cone surface penetrating said spherical shell portion, and wherein the bearing-surface portions of the caging member jointly form on the caging member an outwardly facing cone surface which forms with said surface of revolution an annular gap through which gas passes from the gas bearing.

* * * * *